US011015955B2

(12) United States Patent
Naslund et al.

(10) Patent No.: US 11,015,955 B2
(45) Date of Patent: May 25, 2021

(54) DUAL CHANNEL AIR DATA SYSTEM WITH INERTIALLY COMPENSATED BACKUP CHANNEL

(71) Applicant: Rosemount Aerospace Inc., Burnsville, MN (US)

(72) Inventors: Brian Brent Naslund, Chanhassen, MN (US); John D. Winter, Apple Valley, MN (US); Joel Boelke, Eden Prairie, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 233 days.

(21) Appl. No.: 16/009,875

(22) Filed: Jun. 15, 2018

(65) Prior Publication Data

US 2019/0383639 A1  Dec. 19, 2019

(51) Int. Cl.
*G01C 23/00* (2006.01)
*G01P 5/165* (2006.01)
*G01K 13/02* (2021.01)

(52) U.S. Cl.
CPC ......... *G01C 23/005* (2013.01); *G01K 13/028* (2013.01); *G01P 5/165* (2013.01)

(58) Field of Classification Search
CPC ..... G01C 23/005; G01P 13/025; G01P 5/165; G01K 13/028; B64D 43/02
See application file for complete search history.

(56) References Cited

U.S. PATENT DOCUMENTS

| | | | |
|---|---|---|---|
| 4,112,756 A | 9/1978 | MacLennan et al. |
| 4,143,548 A | 3/1979 | Graewe et al. |
| 4,303,978 A | 12/1981 | Shaw et al. |
| 5,423,209 A | 6/1995 | Nakaya et al. |
| 5,585,557 A | 12/1996 | Loschke et al. |
| 6,012,331 A | 1/2000 | Menzies et al. |
| 6,336,060 B1 | 1/2002 | Shigemi et al. |
| 6,452,542 B1 | 9/2002 | Bachinski et al. |
| 6,561,020 B2 | 5/2003 | Glenney |
| 6,604,029 B2 | 8/2003 | Cronin et al. |
| 6,609,421 B2 | 8/2003 | Cronin et al. |
| 6,626,024 B1 | 9/2003 | Hedrick |

(Continued)

FOREIGN PATENT DOCUMENTS

| | | |
|---|---|---|
| DE | 102014105366 A1 | 10/2015 |
| EP | 1256811 A2 | 11/2002 |

(Continued)

OTHER PUBLICATIONS

Extended European Search Report for European Patent Application No. 17206457.8, dated Feb. 22, 2018, 8 pages.

(Continued)

*Primary Examiner* — Eric S. McCall
*Assistant Examiner* — Timothy P Graves
(74) *Attorney, Agent, or Firm* — Kinney & Lange, P. A.

(57) ABSTRACT

An air data system for an aircraft includes a multi-function probe (MFP) and an inertial reference unit (IRU). The MFP is positioned to sense a pressure of airflow about an exterior of the aircraft. A first electronics channel of the MFP is electrically coupled to the IRU to generate air data parameter outputs based on the pressure sensed by the MFP and inertial data sensed by the IRU.

20 Claims, 3 Drawing Sheets

(56) References Cited

U.S. PATENT DOCUMENTS

| | | | |
|---|---|---|---|
| 6,668,640 B1 * | 12/2003 | Alwin | G01K 13/028 |
| | | | 73/170.02 |
| 7,051,586 B2 | 5/2006 | Choisnet et al. | |
| 7,155,969 B2 | 1/2007 | Drutowski et al. | |
| 7,379,839 B2 | 5/2008 | Cronin et al. | |
| 8,095,251 B2 | 1/2012 | Preaux | |
| 8,261,609 B2 | 9/2012 | Choisnet et al. | |
| 8,365,591 B2 | 2/2013 | Golly | |
| 8,527,233 B2 | 9/2013 | McIntyre | |
| 8,620,495 B2 | 12/2013 | Alwin et al. | |
| 9,121,860 B1 | 9/2015 | Cronyn | |
| 9,612,252 B2 | 4/2017 | Waddington | |
| 9,834,316 B2 | 12/2017 | Rolinski et al. | |
| 2002/0169525 A1 * | 11/2002 | Cronin | G01P 13/025 |
| | | | 701/6 |
| 2004/0122615 A1 | 6/2004 | Cronin et al. | |
| 2007/0107510 A1 | 5/2007 | Agami et al. | |
| 2007/0182590 A1 | 8/2007 | Younkin | |
| 2007/0220967 A1 | 9/2007 | Thomas et al. | |
| 2009/0055036 A1 | 2/2009 | Vozhdaev et al. | |
| 2009/0222150 A1 | 9/2009 | Preaux | |
| 2011/0141471 A1 | 6/2011 | Schlotterbeck et al. | |
| 2012/0123704 A1 | 5/2012 | Golly et al. | |
| 2012/0298801 A1 | 11/2012 | Ellison | |
| 2014/0180503 A1 * | 6/2014 | Colliau | G01P 5/14 |
| | | | 701/3 |
| 2015/0006020 A1 | 1/2015 | D'Arbonneau | |
| 2015/0012155 A1 | 1/2015 | Mandle | |
| 2015/0032300 A1 | 1/2015 | Arethens et al. | |
| 2015/0233962 A1 | 8/2015 | Tchoryk et al. | |
| 2015/0276787 A1 | 10/2015 | Kimmel et al. | |
| 2016/0180611 A1 | 6/2016 | Cadotte et al. | |
| 2016/0305802 A1 | 10/2016 | Chong et al. | |
| 2017/0158347 A1 | 6/2017 | Anderson et al. | |

FOREIGN PATENT DOCUMENTS

| | | | |
|---|---|---|---|
| EP | 1256812 | A2 | 11/2002 |
| EP | 1256863 | A2 | 11/2002 |
| EP | 1391736 | A1 | 2/2004 |
| EP | 1936386 | A2 | 6/2008 |
| EP | 2434296 | A2 | 3/2012 |
| EP | 2453245 | A1 | 5/2012 |
| EP | 2923949 | A1 | 9/2015 |
| EP | 3081945 | A1 | 10/2016 |
| IN | 201301950 | | 6/2016 |
| WO | WO02088632 | A2 | 11/2002 |
| WO | WO2006046271 | A2 | 5/2006 |
| WO | WO2015179905 | A1 | 12/2015 |

OTHER PUBLICATIONS

Extended European Search Report for European Patent Application No. 17207656.4, dated Mar. 2, 2018, 8 pages.

"Deutsche Airbus Flight Test of Rosemount Smart Probe for Districuted Air Data Systems" Floyd W. Hagen and Dr. Harald Seidel, pp. 110-117.

Extended European Search Report for EP Application No. 19175352.4, dated Nov. 12, 2019, pp. 8.

Extended European Search Report for EP Application No. 19179986.5, dated Nov. 12, 2019, pp. 9.

Extended European Search Report for EP Application No. 19180014.3, dated Nov. 22, 2019, pp. 9.

Ardupilot, "Using an Airspeed Sensor, "https://ardupilot.org/plane/docs/airspeed.html, {Jan 16, 2018 Archive copy: https://webarchive.org/web/20180116072550/https://ardupilot.org./plane/docs/airspeed.html] (Year:2018).

* cited by examiner

DUAL CHANNEL AIR DATA SYSTEM WITH INERTIALLY COMPENSATED BACKUP CHANNEL

BACKGROUND

The present disclosure relates generally to air data systems and, more particularly, to air data systems utilizing multi-function probes and an inertial reference unit for generating aircraft air data parameter outputs.

Modern aircraft often incorporate air data systems that calculate air data outputs based on measured parameters collected from various sensors positioned about the aircraft. For instance, many air data systems utilize air data probes that measure pneumatic pressure of airflow about the aircraft exterior to generate aircraft air data outputs, such as angle of attack (i.e., an angle between the oncoming airflow or relative wind and a reference line of the aircraft, such as a chord of a wing of the aircraft), calibrated airspeed, Mach number, altitude, or other air data parameters. During sideslip of the aircraft (i.e., a nonzero angle between the direction of travel of the aircraft and the aircraft centerline extending through the nose of the aircraft), compensation of various local (to the probe) parameters or signals, such as angle of attack and static pressure, is advantageous for accurate determination of aircraft air data parameters, such as aircraft angle of attack or aircraft pressure altitude (determined from static pressure measurements). The air data probes may also be paired with temperature sensors in order to determine static air temperature, total air temperature, and true airspeed.

Increased accuracy achieved through sideslip compensation is particularly relevant in modern aircraft employing advanced control mechanisms that operate in the National Airspace System, as well as to accommodate fly-by-wire or other control systems that may benefit from increased accuracy achieved through sideslip compensation. To this end, many air data systems utilize multiple pneumatic air data probes positioned at opposite sides of the aircraft and cross-coupled to exchange pressure information. Static pressure sensed by an opposite side probe is used to compensate air data parameter outputs for a sideslip condition. In certain air data systems, cross-coupled probes are pneumatically connected so that the pressure signals are averaged between probes. Other air data systems utilize air data probes that are not pneumatically connected, but rather include processors and other electronic components for interchanging electrical signals representative of the pressure information (and other information) between probes. Such probes, having integrated electronics, are often referred to as electronic multi-function probes (MFPs). MFPs reduce the need for pneumatic couplings between the probes, thereby reducing space, cost, and maintenance associated with the pneumatic couplings.

As aircraft systems such as flight control systems and stall protection systems become more highly integrated, complex, and automated, the integrity of air data information used by these aircraft systems becomes increasingly important. As such, these highly complex systems typically utilize redundant inputs of air data information that are measured by independent sources. The independent sources of air data are often desired to be derived from dissimilar equipment to reduce the risk of common mode errors occurring amongst the separate sources of air data. This redundancy, independence, and dissimilarity of air data outputs is strongly recommended worldwide by certification authorities and is typically required for airworthiness certification of the aircraft.

SUMMARY

In one example embodiment, an air data system for an aircraft includes a multi-function probe (MFP) and an inertial reference unit (IRU). The MFP is positioned to sense a pressure of airflow about an exterior of the aircraft. A first electronics channel of the MFP is electrically coupled to the IRU to generate air data parameter outputs based on the pressure sensed by the MFP and inertial data sensed by the IRU.

In another example embodiment, a system for an aircraft includes a first MFP, a second MFP, a third MFP, and an IRU. Each of the first, second, and third MFPs are positioned to sense a pressure of an airflow about an exterior of the aircraft. A first electronics channel of the first MFP and the IRU form a first air data system. A first electronics channel of the second MFP and a second electronics channel of the third MFP form a second air data system, and a second electronics channel of the second MFP and a first electronics channel of the third MFP form a third air data system. The first air data system provides first air data parameter outputs based on pressure sensed by the first MFP and inertial data sensed by the IRU. The second air data system provides second air data parameter outputs based on pressures sensed by the first electronics channel of the second MFP and the second electronics channel of the third MFP. The third air data system provides third air data parameter outputs based on pressures sensed by the second electronics channel of the second MFP and the first electronics channel of the third MFP.

In another example embodiment, a method includes generating air data parameter outputs based on pressure of an oncoming airflow about an exterior of an aircraft sensed by an electronics channel of an MFP and inertial data sensed by an IRU.

DETAILED DESCRIPTION

As described herein, an example air data system architecture includes multi-function probes (MFPs) and an inertial reference unit (IRU) to provide three independent sets of aircraft air data parameter outputs. The first MFP is electrically coupled to the IRU to form a first air data system for providing first aircraft air data parameters compensated for aircraft sideslip conditions. A first electronics channel of the second MFP is electrically coupled to receive static pressure data from a second electronics channel of the third MFP to form a second air data system, and a second electronics channel of the second MFP is electrically coupled to receive static pressure data from a first electronics channel of the third MFP to from a third air data system, each air data system is compensated for aircraft sideslip conditions.

Accordingly, an air data system architecture implementing techniques of this disclosure can provide three separate air data systems that provide three independent sets of aircraft air data parameter outputs without requiring a fourth air data sensor to provide, e.g., cross-side pressure or other measurement information to compensate the air data parameter outputs produced by the first MFP. Moreover, the use of the IRU provides a mechanism for generating aircraft air data parameter outputs that is dissimilar from the pneumatic-based measurements of the MFPs, thereby increasing system dissimilarity.

Figure 1:
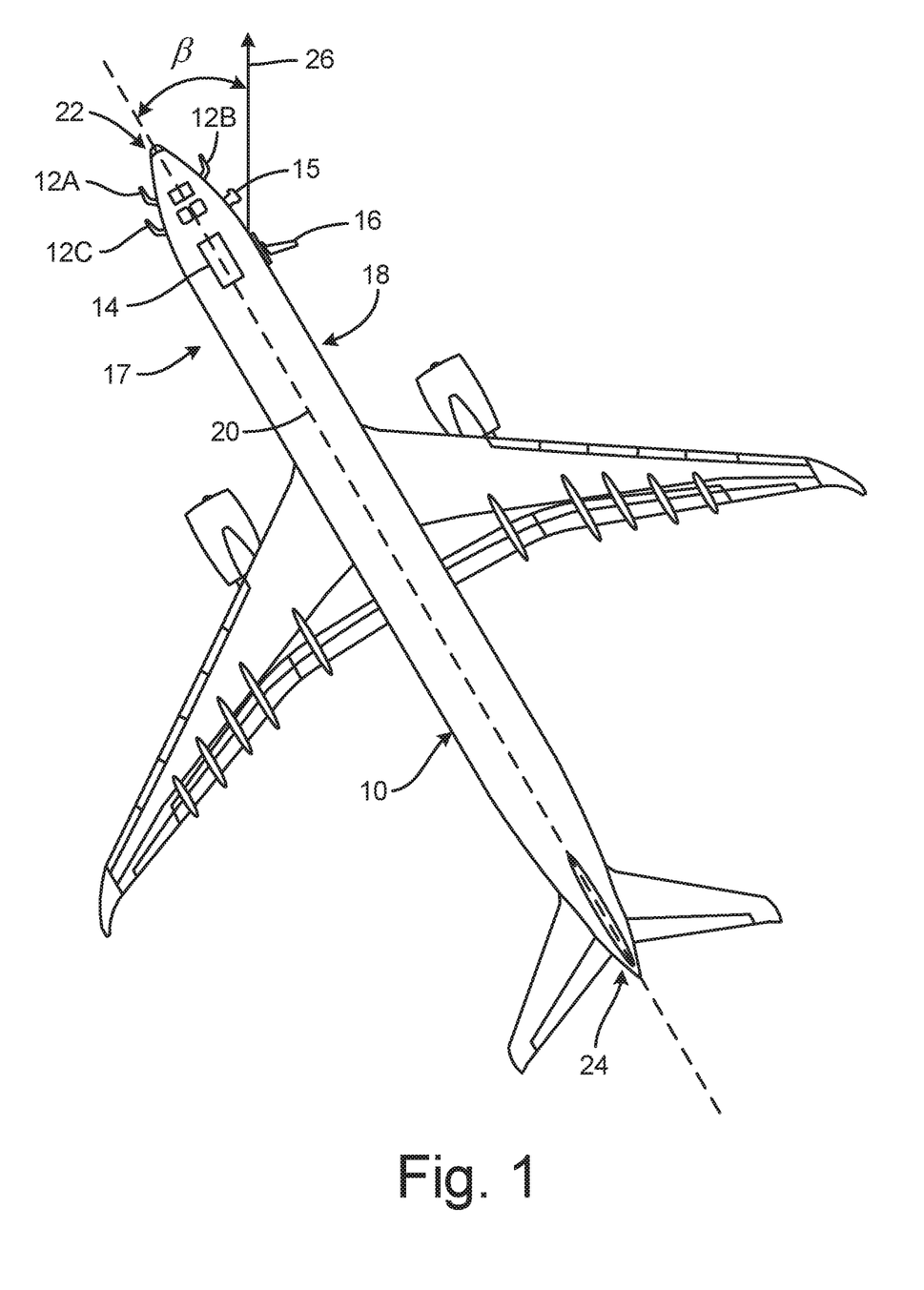
FIG. 1 is a top plan view and schematic representation of an aircraft in a sideslip condition, which includes first, second, and third multi-function probes (MFPs), an inertial reference unit (IRU), an angle of attack (AOA) sensor, and a total air temperature (TAT) sensor.

FIG. 1 is a top plan view and schematic representation of aircraft 10 in a sideslip condition and including first multi-function probe (MFP) 12A, second MFP 12B, third MFP 12C, inertial reference unit (IRU) 14, total air data temperature (TAT) sensor 15, and angle of attack (AOA) sensor 16. As illustrated, aircraft 10 includes first side 17 (or left side) and second side 18 (or right side) that is opposite first side 17 and separated by central plane 20 that extends from nose 22 to tail 24 orthogonal to a plane extending through the wings of aircraft 10. First MFP 12A and third MFP 12C are disposed at first side 17. Second MFP 12B is disposed at second side 18. Inertial reference unit 14 is disposed within aircraft 10. In the example of FIG. 1, TAT sensor 15 and AOA sensor 16 are disposed at second side 18, though in other examples, TAT sensor 15 and AOA sensor 16 can be disposed at other locations, as is known in the art. Likewise, first MFP 12A, second MFP 12B, and third MFP 12C can be disposed on opposite sides of aircraft 10 so long as the relative positions of each MFP is consistent with the following air data system architecture.

First MFP 12A, second MFP 12B, and third MFP 12C are air data sensing probes, each having a barrel portion configured to extend into an oncoming airflow about the exterior of aircraft 10. As will be described in further detail below, each barrel portion includes a plurality of pressure sensing ports including at least a total pressure sensing port at a tip of the barrel portion, alpha pressure sensing ports disposed at a top and bottom of the barrel portion for use in sensing angle of attack of the airflow, and static pressure sensing ports disposed at the top side of the barrel portion and the bottom side of the barrel portion aft of the alpha pressure sensing ports for use in sensing static air pressure of the airflow. Pressure sensors are pneumatically connected to the pressure sensing ports to sense a local pressure associated with the oncoming airflow about aircraft 10 at each port. The pressure sensors may be associated with an electronics channel of one of the MFPs.

Inertial reference unit 14 includes a plurality of inertial sensors used to sense movement of the aircraft in at least two and up to six degrees of freedom. These inertial sensors can include gyroscopic sensors, sensitive to rotational movement of the aircraft about a reference axis, and accelerometers, sensitive to aircraft acceleration along a reference axis, among others. That is to say, other inertial sensors can be used so long as each sensor is responsive to rotational acceleration, linear acceleration, or both. More specifically, gyroscopic sensors measure rotation of the aircraft about a reference axis and can be used to detect roll (i.e., rotation about a longitudinal axis of the aircraft), yaw (i.e., rotation about a vertical axis of the aircraft), and pitch (i.e., rotation about a lateral axis of the aircraft). Accelerometers are used to detect acceleration of the aircraft along a reference axis and can be used to detect forward acceleration or deceleration of the aircraft (i.e., acceleration along the longitudinal axis of the aircraft), lateral acceleration (i.e., acceleration along the lateral axis of the aircraft), and vertical acceleration (i.e., acceleration along the vertical axis of the aircraft). When one or more inertial measurements are used in conjunction with a known aircraft orientation and speed, the aircraft orientation relative to a direction of flight can be determined. For example, the angle of sideslip and angle of attack of the aircraft, which describe the aircraft orientation relative to a direction of airflow, can be determined based on the orientation of the aircraft relative to a direction of aircraft flight. As such, the air data parameters produced by one of the MFPs can be compensated by the angle of sideslip, the angle of attack, or both the angle of attack and angle of sideslip determined by the IRU rather than an additional MFP.

TAT sensor 15 includes one or more temperature sensing elements and conditioning circuitry for sensing total air temperature of airflow about the exterior of aircraft 10 and provides total air temperature data, via an analog or digital signal, for use in generating aircraft air data parameter outputs, such as aircraft true airspeed (TAS) and static air temperature (SAT). AOA sensor 16 is an angle of attack sensing probe configured to extend into the airflow to measure the angle of attack of aircraft 10. To measure the angle of attack of aircraft 10 relative to the oncoming airflow, AOA sensor 16 includes a vane that extends outward from the exterior of aircraft 10. The oncoming airflow acts on the AOA vane, this interaction causing a chord-wise dimension of the AOA vane to align with a direction of oncoming airflow. Rotary encoders within a base of AOA sensor 16 measure the rotation of the AOA vane relative to the base to produce angle of attack data.

Figure 2:
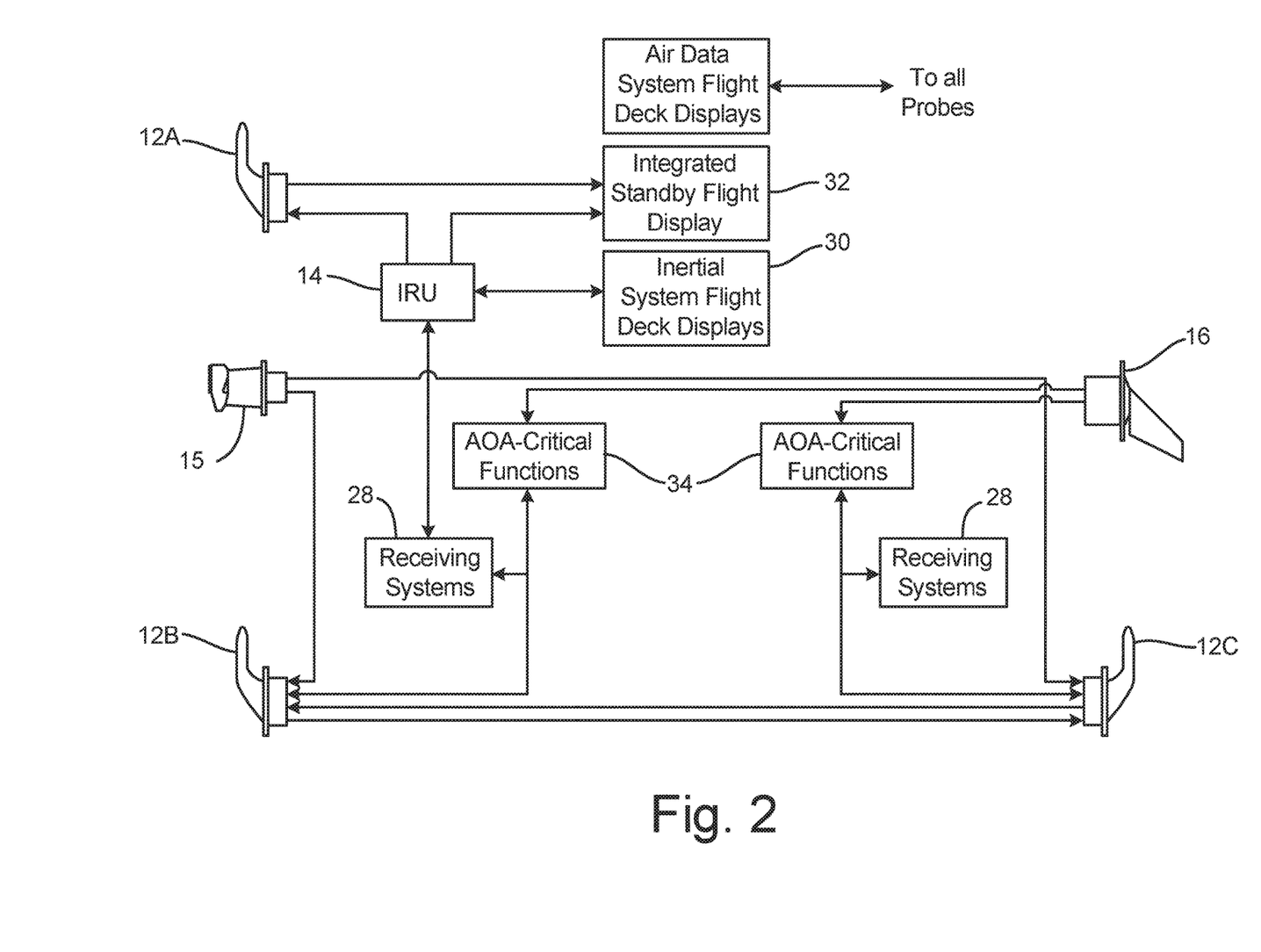
FIG. 2 is a schematic diagram illustrating an example embodiment of an aircraft air data architecture.

FIG. 2 is a schematic diagram illustrating an air data system architecture that includes at least first MFP 12A and IRU 14. A first electronics channel of first MFP 12A includes pressure sensors pneumatically connected to a total pressure sensing port to sense pressure corresponding to stagnation (or total) pressure, two alpha pressure ports to sense differential alpha pressure corresponding to local angle of attack of first MFP 12A, and a static pressure port to sense pressure corresponding to local static pressure of first MFP 12A. Using the sensed pressures, first MFP 12A can determine a set of air data parameters.

The first electronics channel of first MFP 12A is electrically coupled to IRU 14 to compensate (e.g., modify) the air data parameters determined by first MFP 12A based on inertial data received from IRU 14. In some embodiments, IRU 14 provides lateral acceleration of aircraft 10 perpendicular to central plane 20 and yaw angle (i.e., rotation of aircraft 10 about a vertical axis) to first MFP 12A to provide an orientation of aircraft 10 relative to a direction of aircraft flight. For example, lateral acceleration and yaw angle can be used to determine an angle of center plane 20 relative to a direction of flight. During a calibration process that uses free stream measurement techniques (e.g., an aircraft-mounted instrument boom extending forward of the aircraft), free stream air pressures are measured and used to correlate free stream conditions to sensed pressures of the first MFP 12A and inertial data sensed by IRU 14. In this way, the orientation of center plane 20 relative to a direction of flight can be correlated to angle of sideslip β. Accordingly, first MFP 12A and IRU 14 form a first air data system that produces first aircraft air data parameter outputs compensated for aircraft sideslip conditions.

In other embodiments, other inertial data can be provided by IRU 14 to compensate the air data parameter outputs determined by first MFP 12A. For instance, IRU 14 can provide forward acceleration and pitch angle to first MFP 12A whereby first MFP 12A determines an angle of attack based on the received inertial data. In still other embodiments, any one or combination of forward acceleration, lateral acceleration, vertical acceleration, roll angle, yaw angle, and pitch angle can be used to compensate the air data parameters determined by first MFP 12A. In these embodiments, air data parameter outputs can be compensated using one or more of the inertial movements of aircraft 10.

The first air data system can output compensated air data parameters to one of aircraft receiving systems 28, which utilize the first air data parameters in performing various aircraft functions. Separately, IRU 14 transmits inertial data directly to inertial system displays 30 located on the flight deck of aircraft 10. Additionally, the first data system can be used as a backup air data system when combined with one or more primary air data systems. In such embodiments, first MFP 12A transmits compensated first air data parameters and IRU 14 transmits inertial data outputs to standby flight display 32 also located on the flight deck of aircraft 10.

The air data system architecture depicted by FIG. 2 can further include second MFP 12B and third MFP 12C. Each of second MFP 12B and third MFP 12C include two (or more) electronics channels that are electrically connected to form two independent air data systems. For example, in a manner similar to first MFP 12A, each first electronics channels of second MFP 12B and third MFP 12C includes a plurality of pressure sensors pneumatically coupled to a total pressure port and two alpha pressure sensing ports corresponding to stagnation (or total) pressure, local static pressure (measured at one of the alpha pressure sensing ports), and differential alpha pressure corresponding to local angle of attack of respective MFPs. Furthermore, each second electronics channel of second MFP 12B and third MFP 12C includes a pressure sensor that is pneumatically connected to a static pressure sensing port disposed in the barrel portion of respective MFPs aft of the alpha pressure sensing ports to sense local static pressure of the airflow over second MFP 12B and third MFP 12C, respectively.

The first electronics channel of second MFP 12B is electrically coupled to receive static pressure data from the second electronics channel of third MFP 12C and to compensate (e.g., modify) determined local air data parameters based on the received static pressure data, thereby forming a second air data system providing second air data parameter outputs that are compensated for aircraft sideslip conditions. The first electronics channel of third MFP 12C is electrically coupled to receive static pressure data from the second electronics channel of second MFP 12B and to compensate determined local air data parameters based on the received static pressure data, thereby forming a third air data system providing third air data parameter outputs that are compensated for aircraft sideslip conditions.

In the example of FIG. 1, aircraft 10 is illustrated in a sideslip condition where the path of travel of aircraft 10 is indicated at 26, and angle ß between travel path 26 and central plane 20 is the angle of sideslip of aircraft 10. In operation, as air flows over the exterior of aircraft 10, first MFP 12A, second MFP 12B, and third MFP 12C generate local air data parameters (i.e., corresponding to the local conditions of the respective one of first MFP 12A, second MFP 12B, and third MFP 12C) based on sensed pressure data, as is further described below.

In a sideslip condition, second MFP 12B experiences different flow conditions than those experienced by third MFP 12C. For instance, in the sideslip condition having sideslip angle β illustrated in FIG. 1, second MFP 12B experiences airflow having higher pressure conditions than those experienced by third MFP 12C due to the acceleration of the airflow about the aircraft exterior prior to reaching third MFP 12C. Accordingly, the first electronics channel of second MFP 12B is electrically coupled with the second electronics channel of third MFP 12C to receive static pressure data corresponding to static pressure sensed by third MFP 12C via the static pressure port pneumatically connected to a pressure sensor of the second electronics channel of third MFP 12C. The first electronics channel of second MFP 12B determines an angle of sideslip of aircraft 10 as a function of the received static pressure data and compensates the determined local air data parameters based on the angle of sideslip to provide second aircraft air data parameter outputs (e.g., aircraft angle of attack, aircraft angle of sideslip, aircraft calculated airspeed, aircraft Mach number, aircraft pressure altitude, or other aircraft air data parameters outputs). Similarly, the first electronics channel of third MFP 12C is electrically coupled with the second electronics channel of second MFP 12B to receive static pressure data corresponding to static pressure sensed by second MFP 12B via the static pressure port pneumatically connected to a pressure sensor of the second electronics channel of second MFP 12B. The first electronics channel of third MFP 12C determines an angle of sideslip of aircraft 10 as a function of the received static pressure data and compensates the determined local air data parameters based on the angle of sideslip to provide third aircraft air data parameter outputs.

Some embodiments of the air data system architecture may also include total air temperature probe 15. In these embodiments, TAT probe 15 is electrically coupled to each first electronics channel of second MFP 12B and third MFP 12C to provide total air temperature data corresponding to measured total air temperature of the airflow exterior to aircraft 10. Second and third air data parameter outputs provided by second and third air data systems, respectively, may be compensated based on received total air temperature data as well as pressures sensed by second MFP 12B and third MFP 12C.

In still other embodiments, the air data system architecture may include angle of attack sensor 16. Second MFP 12B and third MFP 12C each output angle of attack as a function of differential pressure measured between alpha pressure ports of each MFP. Each of second MFP 12B, third MFP 12C, and AOA sensor 16 provide angle of attack data to AOA-critical functions 34 (e.g., stall warning system) of receiving systems 28. Because AOA sensor 16 calculates angle of attack data based on the rotation of a vane relative to a base of the AOA sensor, and MFPs provide angle of attack data based on sensed pressure, the AOA data provided by AOA sensor 16 is independent and dissimilar from second air data parameters provided by second air data system and third air data parameters provided by third air data systems, thereby increasing system availability and integrity.

Figure 3:
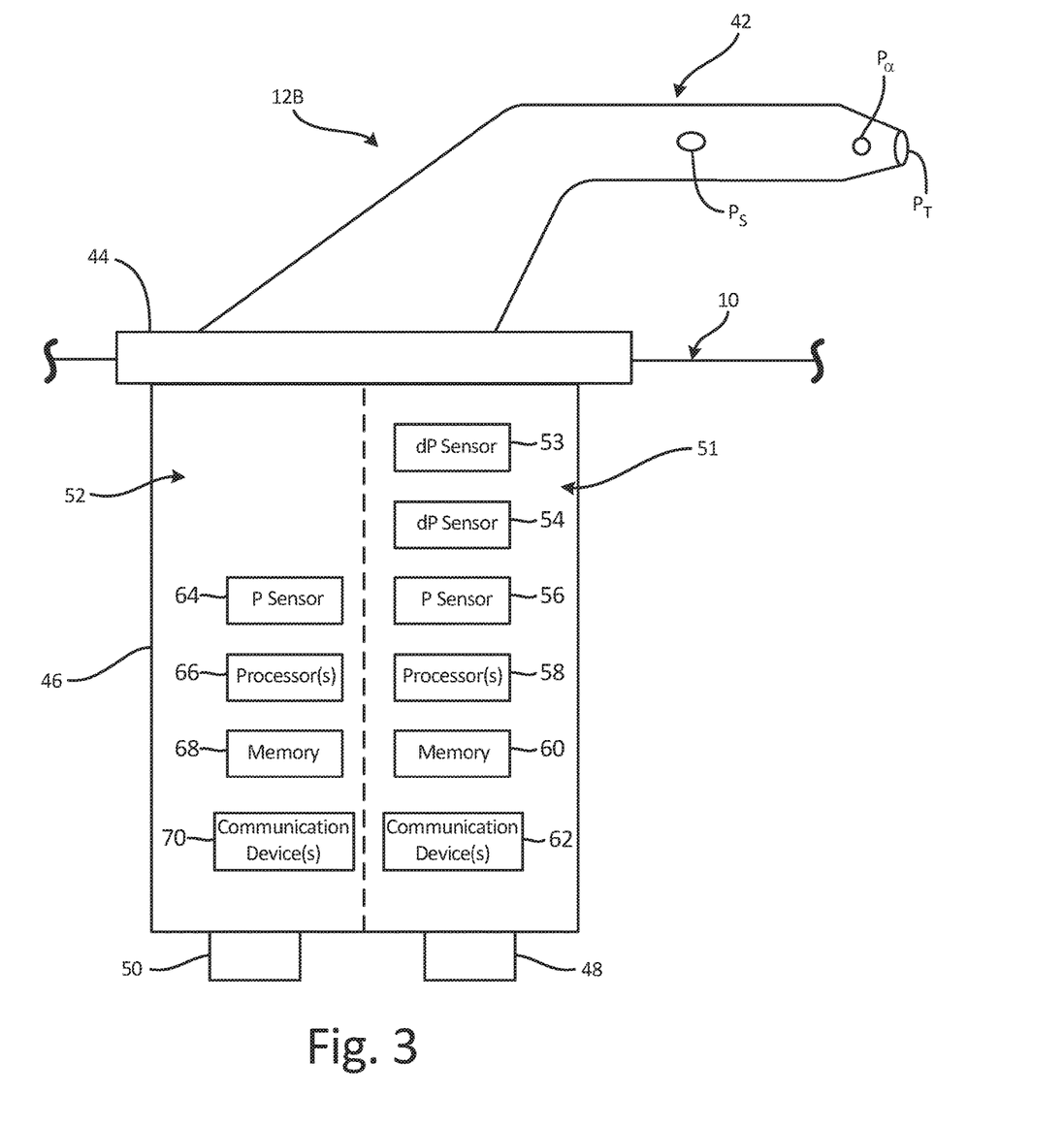
FIG. 3 is a schematic cross-sectional view of a dual-channel multi-function probe (MFP).

FIG. 3 is a schematic cross-sectional view of second MFP 12B. Though described with respect to second MFP 12B, it should be understood that techniques of the example of FIG. 3 are also applicable to first MFP 12A and third MFP 12C.

As illustrated in FIG. 3, second MFP 12B includes barrel portion 42, mounting plate 44, electronics housing 46, first electronics interface connector 48, and second electronics interface connector 50. Total pressure sensing port $P_T$, alpha pressure sensing port $P_\alpha$, and static pressure sensing port $P_s$ are disposed in barrel portion 42. Though not illustrated, a second alpha sensing port is disposed in barrel portion 42 opposite alpha pressure sensing port $P_\alpha$ and a second static pressure sensing port can be disposed in barrel portion 42 opposite static pressure sensing port $P_S$. Electronics housing 46 encloses first electronics channel 51 and second electronics channel 52. First electronics channel 51 includes differential pressure sensor 53, differential pressure sensor 54, absolute pressure sensor 56, one or more processors 58, computer-readable memory 60, and one or more communication devices 62. Second electronics channel 52 includes absolute pressure sensor 64, one or more processors 66, computer-readable memory 68, and one or more communication devices 70.

Mounting plate 44 is configured to mount second MFP 12B to aircraft 10 such that barrel portion 42 is disposed externally to aircraft 10 and extends into an oncoming airflow about the exterior of aircraft 10. Electronics housing 46 extends axially from mounting plate 44 within the interior of aircraft 10. First electronics interface connector 48 and second electronics interface connector 50 each extends axially from electronics housing 46 and each are configured to mate with an electronics communications data bus or other electrical connection.

Each pressure sensing port (e.g., total pressure sensing port PT, alpha pressure sensing port $P_\alpha$, and one or more static pressure sensing ports $P_s$) is pneumatically connected via a manifold or other pneumatic connection (not illustrated) to one or more pressures sensors. For instance, total pressure sensing port $P_T$ is pneumatically connected to differential pressure sensor 53. Alpha pressure sensing port $P_\alpha$ as well as the opposite alpha pressure sensing port (not illustrated) are each pneumatically connected to differential pressure sensor 54. In addition, alpha pressure sensing port $P_\alpha$ is pneumatically connected to pressure sensor 56 (i.e., an absolute pressure sensor). Additionally, static pressure sensing port $P_S$ is pneumatically connected to pressure sensor 64 (i.e., an absolute pressure sensor). If included, opposite side pressure sensing port (not shown) is pneumatically connected to pressure sensor 64. Though pressure sensors 53 and 54 are described herein as differential pressure sensors, in some examples, any one or more of differential pressure sensors 53 and 54 can be implemented as two absolute pressure sensors, the difference between the two measured absolute pressures determined via, e.g., processor 58 and/or processor 66. Examples of processors 58 and 66 can include any one or more of a microprocessor, a controller, a digital signal processor (DSP), an application specific integrated circuit (ASIC), a field-programmable gate array (FPGA), or other equivalent discrete or integrated logic circuitry. Computer-readable memory 60 and 68 can be configured to store information within first electronics channel 51 and second electronics channel 52 during operation. Computer-readable memory, in some examples, is described as a computer-readable storage medium. In certain examples, a computer-readable storage medium can include a non-transitory medium. The term "non-transitory" can indicate that the storage medium is not embodied in a carrier wave or a propagated signal. In some examples, a non-transitory storage medium can store data that can, over time, change (e.g., in RAM or cache). Computer-readable memory can include volatile memory, non-volatile memory, or both. Examples of volatile memories can include random access memories (RAM), dynamic random access memories (DRAM), static random access memories (SRAM), and other forms of volatile memories. Examples of non-volatile memories can include flash memories, forms of electrically programmable memories (EPROM) or electrically erasable and programmable (EEPROM) memories, magnetic hard discs, optical discs, floppy discs, or other forms of non-volatile memories.

First electronics channel 51 and second electronics channel 52 utilize communication device 62 and communication device 70, respectively, to communicate with external devices via first electronics interface connector 48 and second electronics interface connector 50. For example, communication devices 62 and 70 can be network interface cards (or other interface devices) configured to send and receive data over a communications network and/or data bus according to one or more communications protocols, such as the ARINC 429 communication protocol, CAN bus communication protocol, MIL-STD-1553 communication protocol, or other communication protocol.

Circuitry and processor-executable instructions (e.g., stored at computer-readable memory 60 and 68) can be dissimilar between first electronics channel 51 and second electronics channel 52. Dissimilarity between first electronics channel 51 and second electronics channel 52 can be achieved by, e.g., utilizing different components (e.g., different processors from different manufacturers) and/or different processor-executable instructions (e.g., different software or firmware developed by different development teams). As an example, processors 58 and 66 can be different processors or controllers provided by different chip manufacturers. Similarly, computer-readable memory 60 can be of a different type and/or provided by a different manufacturer than that of computer-readable memory 68. Communication devices 62 and 70 can be, e.g., ARINC 429 interfaces provided by different manufacturers or different types of interface devices (e.g., an ARINC 429 interface and a MIL-STD-1553). In general, as the degree of dissimilarity between first electronics channel 51 and second electronics channel 52 increases, the probability of occurrence of a common mode error decreases.

In operation, first electronics channel 51 utilizes differential pressure sensor 53 (measuring differential pressure corresponding to impact pressure), differential pressure sensor 54 (measuring differential pressure corresponding to angle of attack), and pressure sensor 56 (measuring absolute pressure corresponding to local static pressure), and second electronics channel 52 utilizes pressure sensor 64 (measuring absolute pressure corresponding to local static pressure), each channel sensing pressures of the oncoming airflow about the exterior of aircraft 10 to generate local air data parameters including, e.g., local static pressure, local calculated airspeed, local Mach number, local pressure altitude, and local angle of attack, as is known in the art.

First electronics channel 51 receives static pressure data corresponding to static pressure measured by the second electronics channel of third MFP 12C via first electronics interface connector 48 and communication device 62. Processor 58 accesses functional mappings stored at computer-readable memory 60 to compensate the local air data parameters determined by first electronics channel 51 (based on pressure measurements from differential pressure sensor 53, differential pressure sensor 54, and pressure sensor 56) and generate compensated first air data parameter outputs. First electronics channel 51 outputs the compensated first air data parameter outputs to receiving systems 28 (FIG. 2) via communication device 62 and first electronics interface connector 48. It should be understood that first electronics channel of third MFP 12C that is electrically connected to second electronics channel 52 performs similar operations to generate and output compensated third air data parameter outputs to receiving systems 28.

First MFP 12A can include first electronics channel 51 and second electronics channel 52 (or more electronic channels), forming a dual channel (or multi-channel) MFP as described above. However, first MFP 12A can also be a single channel MFP, including only first electronics channel 51 and associated components. In either configuration, first MFP 12A receives inertial data produced by IRU 14 via first electronics interface connector 48. Using a processor to access a functional mapping stored in computer-readable memory to compensate first air data parameter outputs based on the inertial data received via connector 48.

Accordingly, an air data system architecture implementing techniques of this disclosure includes two dual-channel (or multi-channel) MFPs, a single-channel, dual channel, or multi-channel MFP, and an inertial reference unit that are digitally interconnected to form three independent air data systems providing three sets of air data parameter outputs that are compensated for aircraft sideslip conditions. These techniques can help to reduce the cost, weight, and space of the air data system components as compared with architectures utilizing four or more MFPs for data redundancy, independence, and dissimilarity. Availability of air data parameter outputs is enhanced by an optional reversionary mode of the two dual-channel MFPs, thereby further increasing system reliability.

The following are non-exclusive descriptions of possible embodiments of the present invention.

A system in accordance with an exemplary embodiment of the present invention, among other possible things includes a first multi-function probe (MFP) and an inertial reference unit (IRU). The first MFP includes a first plurality of pressure sensing ports for sensing pressure of an oncoming airflow about an aircraft exterior and a first electronics channel operatively associated with the plurality of pressure sensing ports. The IRU includes a plurality of inertial sensors for sensing inertial data of the aircraft. The IRU and the first electronics channel of the first MFP are electrically coupled to form a first air data system to provide first aircraft air data parameter outputs.

The system of the preceding paragraph can optionally include, additionally and/or alternatively, any one or more of the following features, configurations and/or additional components:

A further embodiment of the foregoing system, wherein the first electronics channel of the first MFP can be configured to compensate the first aircraft air data parameter outputs based on inertial data received from the IRU.

A further embodiment of any of the foregoing systems, wherein the first electronics channel of the first MFP can compensate the first aircraft air data parameter outputs based on at least a sensed lateral acceleration of the aircraft and a sensed rotation about a yaw axis of the aircraft.

A further embodiment of any of the foregoing systems, wherein the first electronics channel of the first MFP can be configured to determine an aircraft angle of sideslip based on the inertial data received from the IRU and to compensate the first aircraft air data parameter outputs based on the determined aircraft angle of sideslip.

A further embodiment of any of the foregoing systems, wherein the first electronics channel of the first MFP can be configured to determine an aircraft angle of attack based on the inertial data received from the IRU and to compensate the first aircraft air data parameter outputs based on the determined aircraft angle of attack.

A further embodiment of any of the foregoing systems can further include a second MFP and a third MFP. The second MFP includes a second plurality of pressure sensing ports, and the third MFP includes a third plurality of pressure sensing ports, each of the second and third pluralities of pressure sensing ports is configured for sensing pressure of an oncoming airflow about the aircraft exterior. Each of the second and third MFPs includes first and second electronics channels. The first electronics channel of the second MFP is electrically coupled with the second electronics channel of the third MFP to form a second air data system providing second aircraft air data parameter outputs. The second electronics channel of the second MFP is electronically coupled with the first electronics channel of the third MFP to form a third air data system providing third aircraft air data parameter outputs.

A further embodiment of any of the foregoing systems that include second and third MFPs, wherein the second MFP can receive a first static pressure of the oncoming airflow about the aircraft exterior sensed by the third MFP, and wherein the second aircraft air data parameter outputs can be compensated based on the sensed first static pressure.

A further embodiment of any of the foregoing systems that include second and third MFPs, wherein the third MFP can receive a second static pressure of the oncoming airflow about the aircraft exterior sensed by the second MFP, and wherein the third aircraft air data parameter outputs can be compensated based on the sensed second static pressure.

A further embodiment of any of the foregoing systems, wherein the second MFP can be positioned at a first side of the aircraft, and the third MFP can be positioned at a second side of the aircraft opposite the first side.

A further embodiment of any of the foregoing systems that include first, second, and third air data systems, wherein each of the first aircraft air data parameter outputs, the second aircraft air data parameter outputs, and the third aircraft air data parameter outputs can be provided to receiving systems of the aircraft.

A further embodiment of any of the foregoing systems that include first, second, and third air data systems, wherein the first aircraft air data parameter outputs can be provided to a standby instrument of the receiving systems.

A further embodiment of any of the foregoing systems having second and third MFPs can further include a total air temperature probe electrically coupled to the first electronics channel of the second MFP and the first electronics channel of the third MFP, wherein the total air temperature probe outputs total air temperature data of the airflow about the aircraft exterior received by the first electronics channel of the second MFP and the first electronics channel of the third MFP.

A further embodiment of any of the foregoing systems having the second MFP, the third MFP, and the total air temperature probe, wherein the first electronics channel of the second MFP can be configured to determine the second aircraft air data parameter outputs based on the received total air temperature data.

A further embodiment of any of the foregoing systems having the second MFP, the third MFP, and the total air temperature probe, wherein the first electronics channel of the third MFP can be configured to determine the third aircraft air data parameter outputs based on the received total air temperature data.

A further embodiment of any of the foregoing systems having second and third MFPs, wherein the second aircraft air data parameter outputs and the third aircraft air data parameter outputs include at least an angle of attack.

A further embodiment of any of the foregoing systems having second and third MFPs can further include an angle of attack probe configured to sense angle of attack data of the aircraft.

A further embodiment of any of the foregoing systems having the second MFP, the third MFP, and the angle of attack probe, wherein angle of attack data can be outputted to a receiving system of the aircraft from the angle of attack probe and at least one of the second aircraft air data parameter outputs and the third aircraft air data parameter outputs.

A further embodiment of any of the foregoing systems having the second MFP, the third MFP, and the angle of attack probe, wherein angle of attack data outputted to a receiving system of the aircraft from the angle of attack probe and at least one of the second aircraft air data parameter outputs and the third aircraft air data parameter outputs are dissimilar.

A further embodiment of any of the foregoing systems having the first MFP, the second MFP, the third MFP, wherein each of the first MFP, the second MFP, and the third MFP can include a barrel portion configured to extend into the oncoming airflow about the aircraft exterior.

A further embodiment of any of the foregoing systems in which the first MFP, the second MFP, the third MFP have barrel portions, wherein each of the first plurality of pressure sensing ports, the second plurality of pressure sensing ports, and the third plurality of pressure sensing ports is located on respective barrel portions of the first MFP, the second MFP, and the third MFP.

A further embodiment of any of the foregoing systems in which the first MFP, the second MFP, the third MFP have barrel portions, wherein each the first plurality of pressure sensing ports, the second plurality of pressure sensing ports, and the third plurality of pressure sensing ports includes a total pressure sensing port disposed at a forward tip of respective barrel portions of the first MFP, the second MFP, and third MFP.

A further embodiment of any of the foregoing systems in which the first MFP, the second MFP, the third MFP have barrel portions with the total pressure sensing port, wherein each the first plurality of pressure sensing ports, the second plurality of pressure sensing ports, and the third plurality of pressure sensing ports includes a first alpha pressure sensing port disposed aft of the forward tip at a top side of respective barrel portions of the first MFP, the second MFP, and third MFP.

A further embodiment of any of the foregoing systems in which the first MFP, the second MFP, the third MFP have barrel portions with the total pressure sensing port, wherein each the first plurality of pressure sensing ports, the second plurality of pressure sensing ports, and the third plurality of pressure sensing ports includes a second alpha pressure sensing port disposed aft of the forward tip at a bottom side of respective barrel portions of the first MFP, the second MFP, and third MFP.

A further embodiment of any of the foregoing systems, wherein two or more of the first air data system, the second air data system, and the third air data system are independent and dissimilar.

A method in accordance with an exemplary embodiment of the present invention includes generating first air data parameter outputs from a first electronics channel of a first multi-function probe (MFP) based on pressure of an oncoming airflow about an aircraft exterior sensed by the first MFP and inertial data outputted by inertial sensors of an inertial reference unit (IRU).

The method of the preceding paragraph can optionally include, additionally and/or alternatively, any one or more of the following features, configurations and/or additional components:

A further embodiment of the foregoing method can further include determining at least one of an aircraft angle of sideslip and an aircraft angle of attack based on the inertial data received from the IRU and compensating the first air data parameter outputs from the at least one of the aircraft angle of sideslip and the aircraft angle of attack.

A further embodiment of any of the foregoing methods can further include generating second air data parameter outputs from a first electronics channel of a second MFP based on pressure of the oncoming airflow about the aircraft exterior sensed by the second MFP and a first static pressure sensed by a second electronics channel of a third MFP.

A further embodiment of any of the foregoing methods can further include generating third air data parameter outputs from a first electronics channel of the third MFP based on pressure of the oncoming airflow about the aircraft exterior sensed by the third MFP and a second static pressure sensed by a second electronics channel of the second MFP.

A further embodiment of any of the foregoing methods can further include electrically coupling the first electronics channel of the first MFP to the IRU to form a first air data system.

A further embodiment of any of the foregoing methods can further include electrically coupling the first electronics channel of the second MFP to the second electronics channel of the third MFP to form a second air data system.

A further embodiment of any of the foregoing methods can further include electrically coupling the first electronics channel of the third MFP to the second electronics channel of the second MFP to form a third air data system.

A further embodiment of any of the foregoing methods can further include outputting the first air data parameters, the second air data parameters, and the third air data parameters to a receiving system of the aircraft.

A further embodiment of any of the foregoing methods can further include displaying the first air data parameters to a standby instrument of the receiving systems.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A system comprising:
   a first multi-function probe (MFP) comprising a first plurality of pressure sensing ports for sensing pressure of an oncoming airflow about an aircraft exterior, the first MFP having a first electronics channel;
   a second MFP comprising a second plurality of pressure sensing ports for sensing pressure of an oncoming airflow about an aircraft exterior, the second MFP having a first electronics channel and a second electronics channel; and
   a third MFP comprising a third plurality of pressure sensing ports for sensing the pressure of the oncoming airflow about the aircraft exterior, the third MFP having a first electronics channel and a second electronics channel; and an inertial reference unit (IRU) comprising a plurality of inertial sensors for sensing inertial data of the aircraft;

wherein the IRU and the first electronics channel of the first MFP are electrically coupled to form a first air data system providing first aircraft air data parameter outputs;

wherein the first electronics channel of the second MFP is electrically coupled with the second electronics channel of the third MFP to form a second air data system providing second aircraft air data parameter outputs;

wherein the second electronics channel of the second MFP is electrically coupled with the first electronics channel of the third MFP to form a third air data system providing third aircraft air data parameter outputs;

wherein each of the first air data system, the second air data system, and the third air data system is independent and dissimilar from each other;

wherein each of the first aircraft air data parameter outputs, the second aircraft air data parameter outputs, and the third aircraft air data parameter outputs are provided to receiving systems of the aircraft, and wherein the first aircraft air data parameter outputs are provided to a standby instrument of the receiving systems.

2. The system of claim 1, wherein the first electronics channel of the first MFP is configured to compensate the first aircraft air data parameter outputs based on inertial data received from the IRU.

3. The system of claim 2, wherein the first electronics channel of the first MFP compensates the first aircraft air data parameter outputs based on at least a sensed lateral acceleration of the aircraft and a sensed rotation about a yaw axis of the aircraft.

4. The system of claim 2, wherein the first electronics channel of the first MFP is configured to determine an aircraft angle of sideslip based on the inertial data received from the IRU and to compensate the first aircraft air data parameter outputs based on the determined aircraft angle of sideslip.

5. The system of claim 2, wherein the first electronics channel of the first MFP is configured to determine an aircraft angle of attack based on the inertial data received from the IRU and to compensate the first aircraft air data parameter outputs based on the determined aircraft angle of attack.

6. The system of claim 1,
wherein the second MFP receives a first static pressure of the oncoming airflow about the aircraft exterior sensed by the third MFP;
wherein the third MFP receives a second static pressure of the oncoming airflow about the aircraft exterior sensed by the second MFP;
wherein the second aircraft air data parameter outputs are compensated based on the sensed first static pressure; and
wherein the third aircraft air data parameter outputs are compensated based on the sensed second static pressure.

7. The system of claim 6,
wherein the second MFP is positioned at a first side of the aircraft; and
wherein the third MFP is positioned at a second side of the aircraft opposite the first side.

8. The system of claim 6, and further comprising:
an angle of attack probe configured to sense angle of attack data of the aircraft;
wherein:
the second aircraft air data parameter outputs and the third aircraft air data parameter outputs include at least an angle of attack;
the angle of attack data is outputted to a receiving system of the aircraft from the angle of attack probe and at least one of the second aircraft air data parameter outputs and the third aircraft air data parameter outputs; and
the angle of attack data from the angle of attack probe and the at least one of the second air data parameter outputs and the third air data parameter outputs are dissimilar.

9. The system of claim 1, and further comprising:
a total air temperature probe electrically coupled to each first electronics channel of the second and third MFPs, the total air temperature probe outputting total air temperature data of the airflow about the aircraft exterior;
wherein:
the first electronics channel of the second MFP and the first electronics channel of the third MFP are each configured to receive total air temperature measurement data of airflow about the aircraft exterior;
the first electronics channel of the second MFP is configured to determine the second aircraft air data parameter outputs based on the received total air temperature data; and
the first electronics channel of the third MFP is configured to determine the third aircraft air data parameter outputs based on the received total air temperature data.

10. The system of claim 1,
wherein each of the first MFP, the second MFP, and the third MFP comprise a barrel portion configured to extend into the oncoming airflow about the aircraft exterior;
wherein the first plurality of pressure sensing ports is disposed on the barrel portion of the first MFP;
wherein the second plurality of pressure sensing ports is disposed on the barrel portion of the second MFP; and
wherein the third plurality of pressure sensing ports is disposed on the barrel portion of the third MFP.

11. The system of claim 10, wherein each of the first plurality of pressure sensing ports of the first MFP, the second plurality of pressure sensing ports of the second MFP, and the third plurality of pressure sensing ports of the third MFP comprise: a total pressure sensing port disposed at a forward tip of respective barrel portions; a first alpha pressure sensing port disposed aft of the forward tip at a top side of respective barrel portions; and a second alpha pressure sensing port disposed aft of the forward tip at a bottom side of respective barrel portions opposite the top side.

12. The system of claim 1, wherein the first air data parameters include first angle of attack data based on linear acceleration and rotational acceleration sensed by the IRU, and wherein second air data parameters include second angle of attack data based on pressures sensed by the second MFP, and wherein the second air data parameters or the third air data parameters include fifth angle of attack data based on the position of the angle of attack sensor.

13. The system of claim 12, wherein the first air data parameters include fourth angle of attack data based on pressures sensed by the first MFP.

14. The system of claim 13, wherein the third air data parameters include fifth angle of attack data based on pressure sensed by the third MFP.

15. A method comprising:
generating first air data parameter outputs from a first electronics channel of a first multi- function probe (MFP) based on pressure of an oncoming airflow about an aircraft exterior sensed by the first MFP and inertial data outputted by inertial sensors of an inertial reference unit (IRU), wherein a first air data system includes the first MFP and the IRU;
generating second air data parameter outputs from a first electronics channel of a second MFP based on pressure of the oncoming airflow about the aircraft exterior sensed by the second MFP and a first static pressure sensed by a second electronics channel of a third MFP, wherein a second air data system includes the first electronics channel of the second MFP and the second electronics channel of the third MFP;
generating third air data parameter outputs from a first electronics channel of the third MFP based on pressure of the oncoming airflow about the aircraft exterior sensed by the third MFP and a second static pressure sensed by a second electronics channel of the second MFP, wherein a third air data system includes the first electronics channel of the third MFP and the second electronics channel of the second MFP, and wherein each of the first air data system, the second air data system, and the third air data system is independent and dissimilar from each other;
electrically coupling the first MFP and the IRU to form the first air data system;
electrically coupling the first electronics channel of the second MFP to the second electronics channel of the third MFP to form the second data system;
electrically coupling the second electronics channel of the second MFP to the first electronics channel of the third MFP to form the third data system;
outputting the first air data parameters, the second air data parameters, and the third air data parameters to a receiving system of the aircraft; and
displaying the first air data parameters to a backup instrument of the receiving systems.

16. The method of claim 15, and further comprising:
determining at least one of an aircraft angle of sideslip and an aircraft angle of attack based on the inertial data received from the IRU; and
compensating the first air data parameter outputs from the at least one of the aircraft angle of sideslip and the aircraft angle of attack.

17. The method of claim 15,
wherein generating first air data parameter outputs includes determining a first aircraft angle of attack based on the inertial data received from the IRU;
wherein generating second air data parameter outputs includes determining a second aircraft angle of attack based on pressures sensed by the second MFT; and
wherein generating third air data parameter outputs includes determining a third aircraft angle of attack based on an angular position of an angle of attack sensor.

18. The method of claim 17, wherein generating first air data parameter outputs includes determining a fourth aircraft angle of attack based on pressures sensed by the first MFT.

19. The method of claim 18, wherein generating third air data parameter outputs includes determining a fifth aircraft angle of attack based on pressures sensed by the third MFT.

20. A system for an aircraft comprising:
a first multi-function probe (MFP);
a second multi-function probe (MFP);
a third multi-function probe (MFP), wherein each of the first MFP, the second MFP, and the third MFP comprises a first pressure sensing port, a second pressure sensing port, and a first electronics channel, and wherein each of the second MFP and the third MFP comprises a second electronics channel;
an angle of attack sensor comprising a vane external to the aircraft and rotatable about an axis; and
an inertial reference unit (IRU) comprising a plurality of inertial sensors for sensing inertial data of the aircraft;
wherein the IRU and the first electronics channel of the first MFP are electrically coupled to form a first air data system providing first aircraft air data parameter outputs, the first air data parameter outputs comprising:
a first angle of attack based on a first differential pressure sensed between the first pressure sensing port and the second pressure sensing port of the first MFP; and
a second angle of attack based on inertial data from the IRU;
wherein the first electronics channel of the second MFP is electrically coupled with the second electronics channel of the third MFP to form a second air data system providing second aircraft air data parameter outputs, the second air data parameter outputs comprising:
a third angle of attack based on a second differential pressure sensed between the first pressure sensing port and the second pressure sensing port of the second MFP;
wherein the second electronics channel of the second MFP is electrically coupled with the first electronics channel of the third MFP to form a third air data system providing third aircraft air data parameter outputs, the third air data parameter outputs comprising:
a fourth angle of attack based on a second differential pressure sensed between the first pressure sensing port and the second pressure sensing port of the third MFP; and
wherein the angle of attack sensor provides a fifth angle of attack based on an angular position of the vane about the axis.

* * * * *